(12) United States Patent
Dambal et al.

(10) Patent No.: US 11,740,806 B2
(45) Date of Patent: Aug. 29, 2023

(54) MANAGEMENT CONTROLLER BASED DRIVE MIGRATION

(71) Applicant: Dell Products L.P., Round Rock, TX (US)

(72) Inventors: Sanjeev Dambal, Austin, TX (US); Kumaran Palaniappan, Austin, TX (US); Vigneswaran Ponnusamy, Round Rock, TX (US); Karthikeyan Rajagopalan, Austin, TX (US); Karthik Arunachalam, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/244,638

(22) Filed: Apr. 29, 2021

(65) Prior Publication Data

US 2022/0350501 A1    Nov. 3, 2022

(51) Int. Cl.
*G06F 3/06* (2006.01)
*H04L 9/08* (2006.01)

(52) U.S. Cl.
CPC ......... *G06F 3/0622* (2013.01); *G06F 3/0658* (2013.01); *G06F 3/0679* (2013.01); *H04L 9/083* (2013.01); *H04L 9/0822* (2013.01)

(58) Field of Classification Search
CPC ......... G06F 3/062–0623; G06F 3/0646; G06F 3/0622; G06F 3/0658; G06F 3/0679; G06F 3/0628; G06F 3/0647; G06F 12/14–1408; G06F 12/1458–1466; G06F 21/78; H05L 9/822; H05L 9/083; H04L 9/0822; H04L 9/0891; H04L 9/14; H04L 9/083

See application file for complete search history.

(56) References Cited

U.S. PATENT DOCUMENTS

| | | | |
|---|---|---|---|
| 7,849,510 B2 * | 12/2010 | Danilak | G06F 21/602 713/182 |
| 9,768,952 B1 * | 9/2017 | Allo | G06F 21/80 |
| 10,608,819 B1 * | 3/2020 | Brown | G06F 21/74 |
| 2008/0162809 A1 * | 7/2008 | Rothman | G06F 3/0674 711/114 |
| 2015/0074425 A1 * | 3/2015 | Griffes | G06F 21/79 713/193 |

(Continued)

OTHER PUBLICATIONS

Seagate Technology LLC, "Self-Encrypting Drives for Servers, NAS, and SAN Arrays", 2009 (Year: 2009).*

(Continued)

*Primary Examiner* — Khoa D Doan
(74) *Attorney, Agent, or Firm* — Jackson Walker L.L.P.

(57) ABSTRACT

An information handling system may include a processor and a management controller communicatively coupled to the processor. The management controller may be configured to, in response to an encrypted storage resource being coupled to the information handling system: transmitting a request to at least one other management controller for an encryption key associated with the encrypted storage resource; receiving a response from the at least one other management controller, the response including the encryption key associated with the encrypted storage resource; and unlocking the encrypted storage resource with the received encryption key.

18 Claims, 1 Drawing Sheet

(56) References Cited

U.S. PATENT DOCUMENTS

| | | | |
|---|---|---|---|
| 2015/0121028 A1* | 4/2015 | Gupta | H04L 63/10 |
| | | | 711/164 |
| 2017/0201373 A1* | 7/2017 | Vijayakumar | G06F 11/1433 |
| 2022/0069983 A1* | 3/2022 | Yoshida | H04L 9/3236 |

OTHER PUBLICATIONS

G. R. Ganger et al., "Survivable storage systems," Proceedings DARPA Information Survivability Conference and Exposition II. DISCEX'01, 2001, pp. 184-195 vol.2, doi: 10.1109/DISCEX.2001. 932171. (Year: 2001).*

NetApp, Out-of-band management, 2016 (Year: 2016).*

S. Kumar and Syam Kumar P, "Secure and efficient design and implementation of out-of-band storage virtualization," 2015 IEEE International Advance Computing Conference (IACC), 2015, pp. 1021-1025, doi: 10.1109/IADCC.2015.7154859. (Year: 2015).*

* cited by examiner

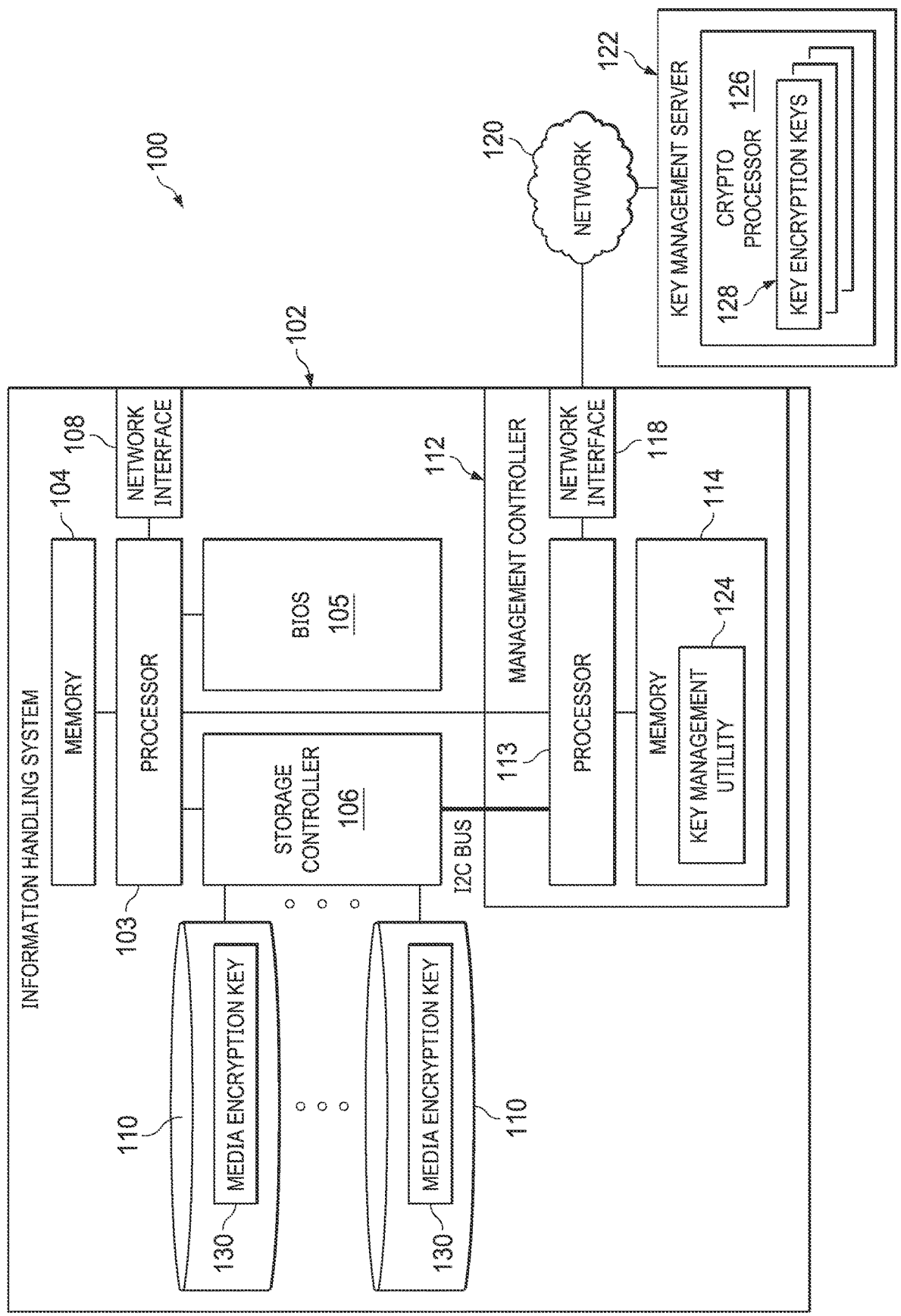

MANAGEMENT CONTROLLER BASED DRIVE MIGRATION

TECHNICAL FIELD

The present disclosure relates in general to information handling systems, and more particularly to management of encrypted storage resources in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Data associated with an information handling system may be stored on a storage resource (e.g., a hard drive, solid state drive, etc.). Some such storage resources may be encrypted according to any of various encryption schemes (e.g., symmetric or asymmetric). One type of storage resource is a self-encrypting storage resource, sometimes known as a self-encrypting drive. The example of self-encrypting drives will be discussed in detail herein for the sake of clarity and exposition, but one of ordinary skill in the art with the benefit of this disclosure will understand its applicability to other types of encryption and other types of storage resources.

In a self-encrypting storage resource, data stored to the storage resource may be encrypted with a media encryption key (MEK), which may also be used to decrypt such data. The MEK itself may also be encrypted with a key encryption key (KEK), which must be provided when the self-encrypting storage resource is powered up in order to unlock the MEK for use. Thus, the MEK is stored in the storage resource, while the KEK can be stored elsewhere within the information handling system (known as local key management) or externally to the information handling system (e.g., maintained by a key management server (KMS), which may implement Secure Enterprise Key Management (SEKM) functionality).

In some implementations, a single KEK may be used to encrypt/decrypt all storage resources within an information handling system. Such a KEK may be stored and serviced by a key management server. During boot of the information handling system, a management controller may securely retrieve the KEK from the key management server and forward the KEK to each storage resource in order to decrypt the individual MEKs for the storage resources, and such individual MEKs may be used to decrypt media stored on the storage resources. In other embodiments, each storage resource in an information handling system may have its own unique KEK for unlocking the MEK of that storage resource.

An issue can arise when a user attempts to migrate a storage resource from one system to another. The destination may include a management controller that may be able to read a identifier (e.g., a key Id value) with which the resource is secured, but it needs a way to access the key corresponding to the key Id to be able to unlock the resource and then secure it with its own native key. With the SEKM solution mentioned above, users generally rely on an external KMS configuration to allow the destination management controller read access to the key.

Configuring an external KMS is a manual task, which may differ for different vendors, and it is something that users need to execute before they can migrate the drive. Users also need to remember to remove the read access after the drive migration activity is completed. There is no existing automated mechanism to allow drive migration, and thus the user typically must manually provide the passphrase to be able to unlock the drive.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with the management of encrypted storage resources in information handling systems may be reduced or eliminated.

In accordance with embodiments of the present disclosure, an information handling system may include a processor and a management controller communicatively coupled to the processor. The management controller may be configured to, in response to an encrypted storage resource being coupled to the information handling system: transmitting a request to at least one other management controller for an encryption key associated with the encrypted storage resource; receiving a response from the at least one other management controller, the response including the encryption key associated with the encrypted storage resource; and unlocking the encrypted storage resource with the received encryption key.

In accordance with these and other embodiments of the present disclosure, a method may include in response to an encrypted storage resource being coupled to an information handling system, a management controller of the information handling system transmitting a request to at least one other management controller for an encryption key associated with the encrypted storage resource; the management controller receiving a response from the at least one other management controller, the response including the encryption key associated with the encrypted storage resource; and the management controller unlocking the encrypted storage resource with the received encryption key.

In accordance with these and other embodiments of the present disclosure, an article of manufacture may include a non-transitory, computer-readable medium having computer-executable instructions thereon that are executable by a processor of a management controller of an information handling system for: in response to an encrypted storage resource being coupled to the information handling system, transmitting a request to at least one other management controller for an encryption key associated with the encrypted storage resource; receiving a response from the at least one other management controller, the response including the encryption key associated with the encrypted storage resource; and the management controller unlocking the encrypted storage resource with the received encryption key.

Technical advantages of the present disclosure may be readily apparent to one skilled in the art from the FIGURES, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates a block diagram of an example information handling system, in accordance with embodiments of the present disclosure.

DETAILED DESCRIPTION

Preferred embodiments and their advantages are best understood by reference to FIG. 1, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example system 100, in accordance with embodiments of the present disclosure. System 100 may include an information handling system 102, a network 120, and a key management server 122.

In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output system (BIOS) 105 communicatively coupled to processor 103, a storage controller 106 communicatively coupled to processor 103, a network interface 108 communicatively coupled to processor 103, a plurality of storage resources 110 communicatively coupled to storage controller 106, a management controller 112 communicatively coupled to processor 103 and storage controller 106, and a cryptoprocessor 126 communicatively coupled to processor 113 of management controller 112.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Storage controller 106 may include any system, apparatus, or device operable to manage the communication of data between processor 103 and storage resources 110. In certain embodiments, storage controller 106 may provide functionality including, without limitation, disk aggregation and redundancy (e.g., RAID), I/O routing, and error detection and recovery. Storage controller 106 may also have features supporting shared storage and high availability. In some embodiments, storage controller 106 may comprise a PowerEdge RAID Controller (PERC) manufactured by Dell Inc.

Network interface 108 may comprise any suitable system, apparatus, or device operable to serve as an interface between information handling system 102 and one or more other information handling systems. Network interface 108 may enable information handling system 102 to communicate using any suitable transmission protocol and/or standard. In these and other embodiments, network interface 108 may comprise a network interface card, or "NIC."

A storage resource 110 may include one or more hard disk drives, magnetic tape libraries, optical disk drives, magneto-optical disk drives, compact disk drives, compact disk arrays, disk array controllers, and/or any other system, apparatus or device operable to store media. In some embodiments, storage resource 110 may comprise a plurality of physical storage resources that may appear to an operating system or virtual machine executing on information handling system 102 as a single logical storage unit or virtual storage resource. For example, each such virtual storage resource may comprise a RAID. Thus, in some embodiments, a virtual storage resource may comprise a redundant array of physical storage resources. In the same or alternative embodiments, a virtual storage resource may be implemented using a RAID standard. Although FIG. 1 depicts storage resource 110 internal to information handling system 102, in some embodiments, storage resource 110 may be external to information handling system 102 (e.g., embodied by a physical array of external hard disk drives).

Storage resources 110 may be coupled to information handling system 102 via storage controller 106 in some embodiments. In other embodiments, they may be coupled directly to a motherboard or backplane of information handling system 102 (which may be referred to as a "direct-attached" scenario). As shown in FIG. 1, in addition to data stored on a storage resource 110, a storage resource 110 may have a media encryption key (MEK) 130. In operation of storage resource 110, data written to storage resource 110 may be encrypted with MEK 130 prior to storage on storage resource 110 and data read from storage resource 110 may be decrypted with MEK 130. In such embodiments, storage resource 110 may include all necessary logic and functionality to perform such encryption and decryption, and thus storage resource 110 may comprise a self-encrypting storage resource referred to as a self-encrypting drive.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118 separate from and physically isolated from in-band network interface 108.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112. As shown in FIG. 1, processor 113 may be coupled to storage controller 106 via an Inter-Integrated Circuit (I2C) bus or other suitable interconnect.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112.

As shown in FIG. 1, memory 114 may have stored thereon a key management utility 124. Key management utility 124 may be configured to receive an instruction to perform any of various management functions with respect to key encryption keys (KEKs) that may be used to securely encrypt MEKs 130 of storage resource 110. In some embodiments, key management utility 124 may be implemented as a program of instructions that may be read by and executed on processor 113 to carry out the functionality of key management utility 124.

Network interface 118 may comprise any suitable system, apparatus, or device operable to serve as an interface between management controller 112 and/or one or more other information handling systems. Network interface 118 may enable management controller 112 to communicate using any suitable transmission protocol and/or standard. In these and other embodiments, network interface 118 may comprise a network interface card, or "NIC."

Network 120 may comprise a network and/or fabric configured to couple information handling system 102 and key management server 122 to each other and/or one or more other information handling systems. In these and other embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

In some embodiments, management controller 112 may be communicatively coupled to other management controllers (e.g., components of different information handling systems) via network 120. For example, a feature such as Group Manager by Dell Inc. (or similar functionality) may be implemented to offer simplified management of management controllers and associated servers, which may reside on the same local network. The Group Manager feature may allow a one-to-many console experience via which an administrator can view the details of a set of servers, permitting more powerful management than by inspecting servers visually for faults and other manual methods. In general, Group Manager may provide a secure and authenticated communication channel among a plurality of management controllers 112.

In addition to processor 103, memory 104, BIOS 105, a storage controller 106, network interface 108, storage resource 110, and management controller 112, information handling system 102 may include one or more other information handling resources.

Key management server 122 may comprise an information handling system, and it may include any system, device, or apparatus configured to implement SEKM to securely manage key encryption keys 128 for use by storage resources 110.

As shown in FIG. 1, key management server 122 may comprise a cryptoprocessor 126. Cryptoprocessor 126 may include any system, device, or apparatus configured to carry out cryptographic operations on data communicated to it from information handling system 102 or elsewhere. In some embodiments, cryptoprocessor 126 may be compliant with the Trusted Platform Module (TPM) specification, a successor specification, and/or any other similar specification. In some embodiments, cryptoprocessor 126 may be configured to generate random numbers, generate encryption keys (e.g., RSA keys), generate and maintain hash key tables of hardware and software components of information handling system 102, generate and maintain configuration parameters associated with hardware and software components of an information handling system, wrap (e.g., encrypt) keys, unwrap (e.g., decrypt) keys, and/or store keys (e.g., endorsement key, storage root key, attestation identity keys, storage keys, etc.).

In some embodiments, cryptoprocessor 126 may comprise a non-volatile memory accessible only to cryptoprocessor 126. As shown in FIG. 1, such non-volatile memory may store a plurality of key encryption keys (KEK) 128. Each KEK 128 may comprise a cryptographic key which may be used to, among other things, decrypt a corresponding MEK 130 upon initialization of storage resource 110 such that MEK 130 may be unlocked for use to encrypt data written to storage resource 110 and/or decrypt data read from storage resource 110. In some embodiments, each storage resource 110 of information handling system 102 may have its own unique corresponding KEK 128 stored on key management server 122, and in other embodiments a particular KEK 128 may be shared by more than one storage resource 110.

As discussed above, existing solutions for migrating a storage resource 110 from one information handling system to another (which may typically include migration from one management controller to another) have been found lacking.

Thus according to some embodiments of the present disclosure, improved methods for migration may be implemented. In particular, users can leverage the existing Group Manager functionality, grouping management controllers into a group that can allow drive migration within the group a single group. For example, a configuration option may be set that allows users to choose if they wish to allow key exchange in a management controller group.

Thus when a drive migrates between any of the management controllers within the group, the destination management controller may broadcast a secure request asking for the key associated with the keyId associated with the drive. A management controller in that group may recognize the keyId and retrieve the key (e.g., either from the external KMS in case of SEKM or from its own credential vault in case of LKM). It will then send the key to the requesting destination management controller.

The destination management controller may unlock the drive with the received key, and then re-key the drive to its native key. According to standard Group Manager protocol, the communication between management controllers in a group may be secured and encrypted, and hence the keys will be sent securely between management controllers.

In some embodiments, a management controller may write identifying information (e.g., its service tag, serial number, or other identifying information) onto a storage resource 110. In this embodiment, the broadcast-style request for fetching the key may be avoided. Rather, the destination management controller may read the identifying information from the storage resource 110 to determine which management controller within the group possesses its key, and then direct the key request only to that management controller.

Some embodiments may also be implemented in the context of LKM (e.g., PERC Local Key Management using storage controller 106) as well. Currently, a user may manually unlock a drive by providing the a passphrase associated with the storage controller 106 of the source information handling system. But according to embodiments of this disclosure, the destination management controller may fetch the key from the source storage controller 106 and unlock the migrated drive without any manual intervention by the user.

Thus embodiments of this disclosure may provide many benefits. For example, there currently exists no mechanism to exchange keys between management controllers to enable drive migration. Embodiments of this disclosure may leverage the existing Group Manager functionality to enable key exchange between management controllers, allowing users to migrate drives with no manual intervention and no external KMS configuration.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a processor; and
a management controller communicatively coupled to the processor and configured to, in response to an encrypted storage resource being removed from a prior information handling system that includes a prior management controller, and the encrypted storage resource being coupled to the information handling system:
transmit a request to the prior management controller for an encryption key associated with the encrypted storage resource, wherein the request indicates a key identifier stored on the encrypted storage resource;
receive a response from the prior management controller, the response including the encryption key associated with the encrypted storage resource;
unlock the encrypted storage resource with the received encryption key; and
re-encrypt the unlocked storage resource with an encryption key associated with the management controller;
wherein the prior management controller is configured to provide out-of-band management of the prior information handling system, and wherein the management controller is configured to provide out-of-band management of the information handling system.

2. The information handling system of claim 1, wherein the encrypted storage resource is a self-encrypting storage resource.

3. The information handling system of claim 2, wherein the encrypted storage resource includes a media encryption key for encrypting data written to the encrypted storage resource and decrypting data read from the encrypted storage resource, wherein the media encryption key is encrypted by a corresponding key encryption key, and wherein the received encryption key is the key encryption key.

4. The information handling system of claim 1, wherein the encrypted storage resource is coupled to the information handling system via a RAID storage controller.

5. The information handling system of claim 1, wherein the request is broadcast to a plurality of management controllers within a single management group.

6. The information handling system of claim 1, wherein the request is transmitted only to the prior management controller based on the key identifier stored on the encrypted storage resource.

7. A method comprising:
in response to an encrypted storage resource being removed from a prior information handling system that includes a prior management controller, and the encrypted storage resource being coupled to an information handling system, a management controller of the information handling system transmitting a request to the prior management controller for an encryption key associated with the encrypted storage resource, wherein the request indicates a key identifier stored on the encrypted storage resource;
the management controller receiving a response from the prior management controller, the response including the encryption key associated with the encrypted storage resource;
the management controller unlocking the encrypted storage resource with the received encryption key; and
the management controller e-encrypting the unlocked storage resource with an encryption key associated with the management controller;
wherein the prior management controller is configured to provide out-of-band management of the prior information handling system, and wherein the management controller is configured to provide out-of-band management of the information handling system.

8. The method of claim 7, wherein the encrypted storage resource is a self-encrypting storage resource.

9. The method of claim 8, wherein the encrypted storage resource includes a media encryption key for encrypting data written to the encrypted storage resource and decrypting data read from the encrypted storage resource, wherein the media encryption key is encrypted by a corresponding key encryption key, and wherein the received encryption key is the key encryption key.

10. The method of claim 7, wherein the encrypted storage resource is coupled to the information handling system via a RAID storage controller.

11. The method of claim 10, wherein the request is broadcast to a plurality of management controllers within a single management group.

12. The method of claim 7, wherein the request is transmitted only to the prior management controller based on the key identifier stored on the encrypted storage resource.

13. An article of manufacture comprising a non-transitory, computer-readable medium having computer-executable instructions thereon that are executable by a processor of a management controller of an information handling system for:

in response to an encrypted storage resource being removed from a prior information handling system that includes a prior management controller, and the encrypted storage resource being coupled to the information handling system, transmitting a request to the prior management controller for an encryption key associated with the encrypted storage resource, wherein the request indicates a key identifier stored on the encrypted storage resource;

receiving a response from the prior management controller, the response including the encryption key associated with the encrypted storage resource;

the management controller unlocking the encrypted storage resource with the received encryption key; and the management controller re-encrypting the unlocked storage resource with an encryption key associated with the management controller;

wherein the prior management controller is configured to provide out-of-band management of the prior information handling system, and wherein the management controller is configured to provide out-of-band management of the information handling system.

14. The article of claim 13, wherein the encrypted storage resource is a self-encrypting storage resource.

15. The article of claim 14, wherein the encrypted storage resource includes a media encryption key for encrypting data written to the encrypted storage resource and decrypting data read from the encrypted storage resource, wherein the media encryption key is encrypted by a corresponding key encryption key, and wherein the received encryption key is the key encryption key.

16. The article of claim 13, wherein the encrypted storage resource is coupled to the information handling system via a RAID storage controller.

17. The article of claim 13, wherein the request is broadcast to a plurality of management controllers within a single management group.

18. The article of claim 13, wherein the request is transmitted only to the prior management controller based on the key identifier stored on the encrypted storage resource.

* * * * *